United States Patent
Misra et al.

(10) Patent No.: US 10,204,032 B2
(45) Date of Patent: Feb. 12, 2019

(54) GENERATING TEST DATA FROM SAMPLES USING NATURAL LANGUAGE PROCESSING AND STRUCTURE-BASED PATTERN DETERMINATION

(71) Applicant: Accenture Global Solutions Limited, Dublin (IE)

(72) Inventors: Janardan Misra, Bangalore (IN); Milind Savagaonkar, Bangalore (IN); Neville Dubash, Mumbai (IN); Sanjay Podder, Thane (IN); Rashmi Singh, Bijnor (IN); Venkat Surya, Chennai (TN)

(73) Assignee: Accenture Global Solutions Limited, Dublin (IE)

( * ) Notice: Subject to any disclaimer, the term of this patent is extended or adjusted under 35 U.S.C. 154(b) by 82 days.

(21) Appl. No.: 15/403,777

(22) Filed: Jan. 11, 2017

(65) Prior Publication Data

US 2017/0344464 A1   Nov. 30, 2017

(30) Foreign Application Priority Data

May 27, 2016 (IN) .............................. 201641018370

(51) Int. Cl.
*G06F 11/36* (2006.01)

(52) U.S. Cl.
CPC ................................ *G06F 11/3684* (2013.01)

(58) Field of Classification Search
CPC .................................................. G06F 11/3684
(Continued)

(56) References Cited

U.S. PATENT DOCUMENTS

| 8,359,292 B2 * | 1/2013 | Morrison | G06F 11/3466 |
| | | | 707/688 |
| 8,935,575 B2 * | 1/2015 | Patwardhan | G06F 11/3684 |
| | | | 714/32 |

(Continued)

FOREIGN PATENT DOCUMENTS

WO   2010/030794   3/2010

OTHER PUBLICATIONS

Extended European Search Report corresponding to EP 17165171.4, dated Oct. 6, 2017, 8 pages.

*Primary Examiner* — Qing Chen
*Assistant Examiner* — Clint Thatcher
(74) *Attorney, Agent, or Firm* — Harrity & Harrity, LLP

(57) ABSTRACT

A method may include receiving a plurality of samples that include textual content. The method may include extracting unit values, corresponding to structural units, from the plurality of samples. The structural units may identify characteristics of the plurality of samples to be used to identify pattern information. The pattern information may identify unit values that are shared between at least two samples of the plurality of samples. The method may include generating one or more structural representations based on the unit values. The one or more structural representations may identify the pattern information. The method may include generating one or more additional samples based on the one or more structural representations. The one or more additional samples may include at least one of the unit values, and may be generated based on the pattern information. The method may include outputting the one or more additional samples.

20 Claims, 14 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 9,767,192 | B1* | 9/2017 | Russak | G06F 17/30707 |
| 9,836,389 | B2* | 12/2017 | Levy | G06F 11/3684 |
| 2008/0097974 | A1* | 4/2008 | Chen | G06F 11/3684 |
| 2010/0005426 | A1 | 1/2010 | Van et al. | |
| 2010/0049703 | A1* | 2/2010 | Coiera | G06F 17/30719 |
| | | | | 707/603 |
| 2013/0159974 | A1* | 6/2013 | Norton | G06F 11/3684 |
| | | | | 717/124 |
| 2015/0169428 | A1* | 6/2015 | Isman | G06F 11/36 |
| | | | | 717/124 |
| 2017/0004413 | A1* | 1/2017 | Flores | G06N 99/005 |
| 2017/0371967 | A1* | 12/2017 | Pieper | G06F 17/30867 |
| 2018/0046939 | A1* | 2/2018 | Meron | G06N 99/005 |
| 2018/0114142 | A1* | 4/2018 | Mueller | G06N 99/005 |
| 2018/0129663 | A1* | 5/2018 | Ivanov | G06F 17/30867 |

\* cited by examiner

| URL Structural Unit | Values from Positive Samples | Values from Negative Samples | Conflicts |
|---|---|---|---|
| scheme | https, http | http, mailto, ftp | http |
| username | myname | sp249 | |
| password | mypassword | | |
| node | www, dca, en | www, books, public | www |
| subdomain | nla | ftp-servers | |
| domain | httpwatch, doc, korea, google, example, wikipedia, microsoft | abc, google, example, httpwatch, cam, princeton, asp | httpwatch, google, example |
| extension | com, gov, ac, co, museum, org | co, com, ac, edu, net | com, co, ac |
| country code | kr, in | uk, in | in |
| port | 443, 80 | 80 | 80 |
| path | features.htm, listener.do, path/to/myfile.html | books, over/there, features.htm, mydirectory/myfile.txt | features.htm |
| query | layout=fn_3, key1=value1&key2=value2 | id = s6, name=ferret | |
| fragment | filter, page99 | refoninternet, print | |

538   540   542

Client Device 210

For each structural unit, determine positive patterns, negative patterns and potentially conflicting patterns

GENERATING TEST DATA FROM SAMPLES USING NATURAL LANGUAGE PROCESSING AND STRUCTURE-BASED PATTERN DETERMINATION

RELATED APPLICATION

This application claims priority under 3 U.S.C. § 119 to Indian Patent Application No. 201641018370, filed on May 27, 2016, the content of which is incorporated by reference herein in its entirety.

BACKGROUND

When testing a computer program, a user may input samples of test data (e.g., textual samples, numerical samples, etc.) to the computer program to determine whether the program properly handles the samples. One approach to testing the computer program uses positive samples. For example, if the computer program is to behave in a particular fashion upon receiving a sample in a particular format, samples in the particular format may be referred to as positive samples, and may be used to ensure that the computer program behaves as expected. Another approach to testing the computer program uses negative samples. In the above example, a negative sample is a sample that does not match the particular format. Negative samples may be used to test whether the computer program properly rejects samples not in the particular format.

SUMMARY

A device may receive a plurality of samples that include textual content. The device may extract unit values, corresponding to structural units, from the plurality of samples. The structural units may identify characteristics of the plurality of samples to be used to identify pattern information relating to the plurality of samples. The pattern information may identify shared unit values, of the unit values, that are included in at least two samples of the plurality of samples. The device may generate one or more structural representations based on the unit values. The one or more structural representations may identify the pattern information. The device may generate one or more additional samples based on the one or more structural representations. The one or more additional samples may include at least one of the unit values, and the one or more additional samples may be generated based on the pattern information. The device may output the one or more additional samples.

A non-transitory computer-readable medium may store one or more instructions that, when executed by one or more processors, may cause the one or more processors to receive a plurality of samples that include textual content. The one or more instructions, when executed by the one or more processors, may cause the one or more processors to extract unit values, corresponding to structural units, from the plurality of samples. The structural units may identify characteristics of the plurality of samples to be used to identify pattern information relating to at least two samples of the plurality of samples. The pattern information may identify unit values that are shared between the at least two samples. The one or more instructions, when executed by the one or more processors, may cause the one or more processors to generate one or more structural representations based on the unit values. The one or more structural representations may identify the pattern information. The one or more instructions, when executed by the one or more processors, may cause the one or more processors to generate one or more additional samples based on the one or more structural representations. The one or more additional samples may include at least one of the unit values, and the one or more additional samples may be generated based on the pattern information. The one or more instructions, when executed by the one or more processors, may cause the one or more processors to provide the one or more additional samples.

A method may include receiving, by a device, a plurality of samples that include textual content. The method may include extracting, by the device, unit values, corresponding to structural units, from the plurality of samples. The structural units may identify characteristics of the plurality of samples to be used to identify pattern information relating to the plurality of samples. The pattern information may identify unit values that are shared between at least two samples of the plurality of samples. The method may include generating, by the device, one or more structural representations based on the unit values. The one or more structural representations may identify the pattern information. The method may include generating, by the device, one or more additional samples based on the one or more structural representations. The one or more additional samples may include at least one of the unit values, and may be generated based on the pattern information. The method may include outputting, by the device, the one or more additional samples.

BRIEF DESCRIPTION OF THE DRAWINGS

FIGS. 5A-5E are diagrams of an example implementation relating to the example process shown in FIG. 4.

DETAILED DESCRIPTION

Figure 1A:
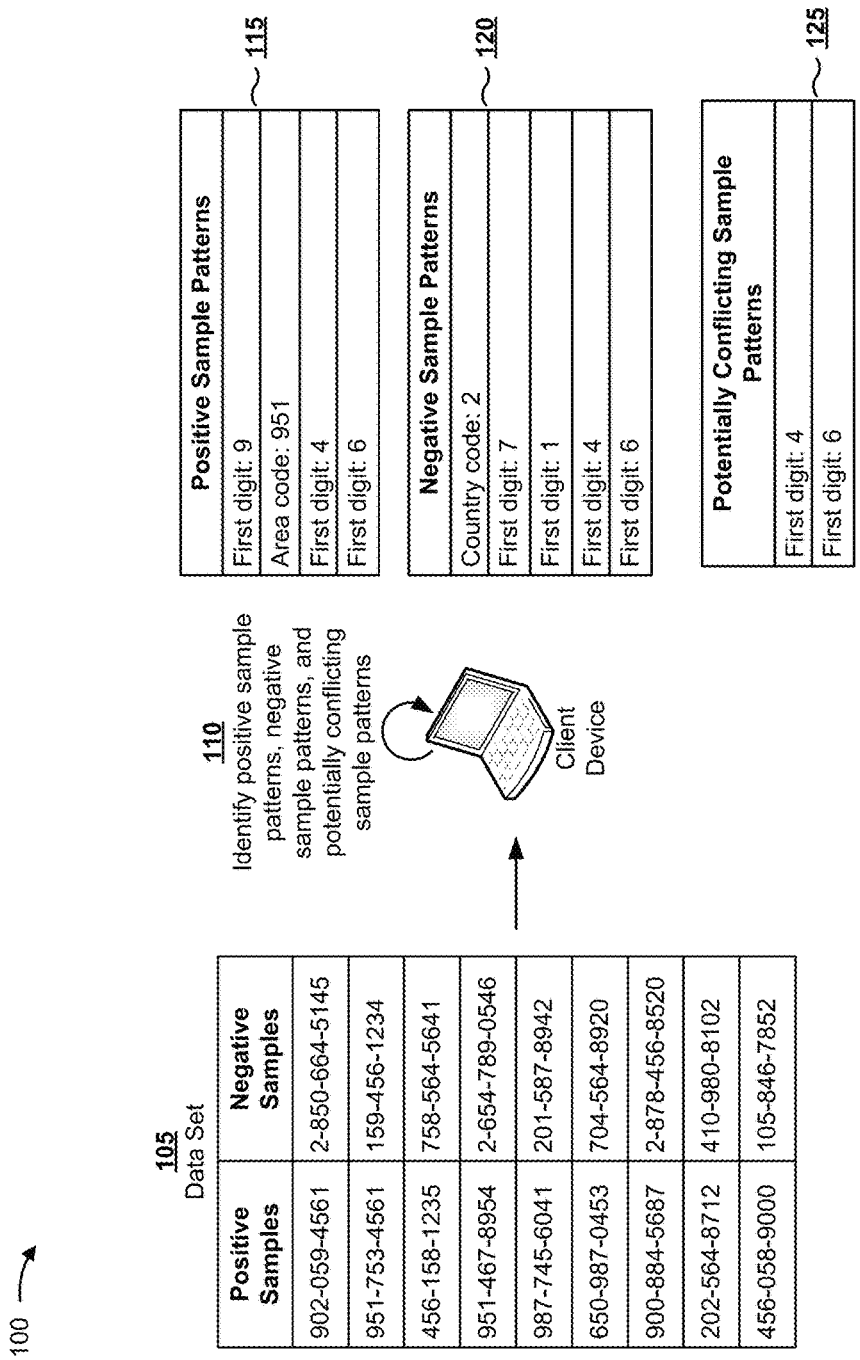
FIGS. 1A and 1B are diagrams of an overview of an example implementation described herein.

The following detailed description of example implementations refers to the accompanying drawings. The same reference numbers in different drawings may identify the same or similar elements.

A user (e.g., a software engineer) may design a software application based on provided requirements. The requirements may indicate particular values that are permitted or are not permitted to be associated with an object that is being modelled. The user may utilize test data to determine whether the software application accurately implements the requirements. The test data may include positive samples of textual content (i.e., samples that satisfy the requirements) and/or negative samples of textual content (i.e., samples that do not satisfy the requirements).

However, in some cases, the test data may include an insufficient quantity of samples to facilitate thorough testing of the software application. Also, the user may not have access to information identifying the requirements. Therefore, to generate a quantity of samples sufficient to properly test the software application, the user may need to identify patterns describing positive samples and/or negative samples, and may need to manually generate additional samples. Furthermore, when the test data does not include a large quantity of samples, the user may have difficulty detecting potentially conflicting patterns in the test data. For example, when generating positive samples based on a sample set, the user may inadvertently generate a negative sample based on a particular pattern that applies to both positive and negative samples of the sample set.

Implementations described herein may extract values (e.g., textual content) of structural units included in a data set of samples. A structural unit may include a standardized portion of a sample to be used to identify patterns in the data set. Implementations described herein may identify patterns describing the data set of samples, may determine potentially conflicting patterns when the data set includes positive samples and negative samples, and may generate additional samples based on the extracted values and based on the patterns. Implementations described herein may automate pattern extraction and sample generation, which may reduce the time and manual effort needed during a software design phase. Further, implementations described herein may result in more accurate pattern extraction and sample generation, which may reduce the processing resources needed during software development and design, and which may reduce errors in software development and design.

Further, implementations described herein may improve software accuracy, which may reduce software errors and/or flaws, may reduce security issues, may conserve processing resources, or the like. For example, by generating additional samples based on which to test the software, implementations described herein may improve thoroughness of the testing process, may increase a likelihood that a particular programming error is discovered based on a particular combination of structural unit values, or the like.

While implementations described herein are primarily described in the context of test data sets including positive samples and/or negative samples, implementations described herein are not limited to test data sets, positive samples, and/or negative samples. For example, implementations described herein may be applied with regard to a single group of samples, with regard to two different groups of samples not associated with positive test data and/or negative test data, with regard to samples of an arbitrary quantity of groups, or the like.

Figure 1B:
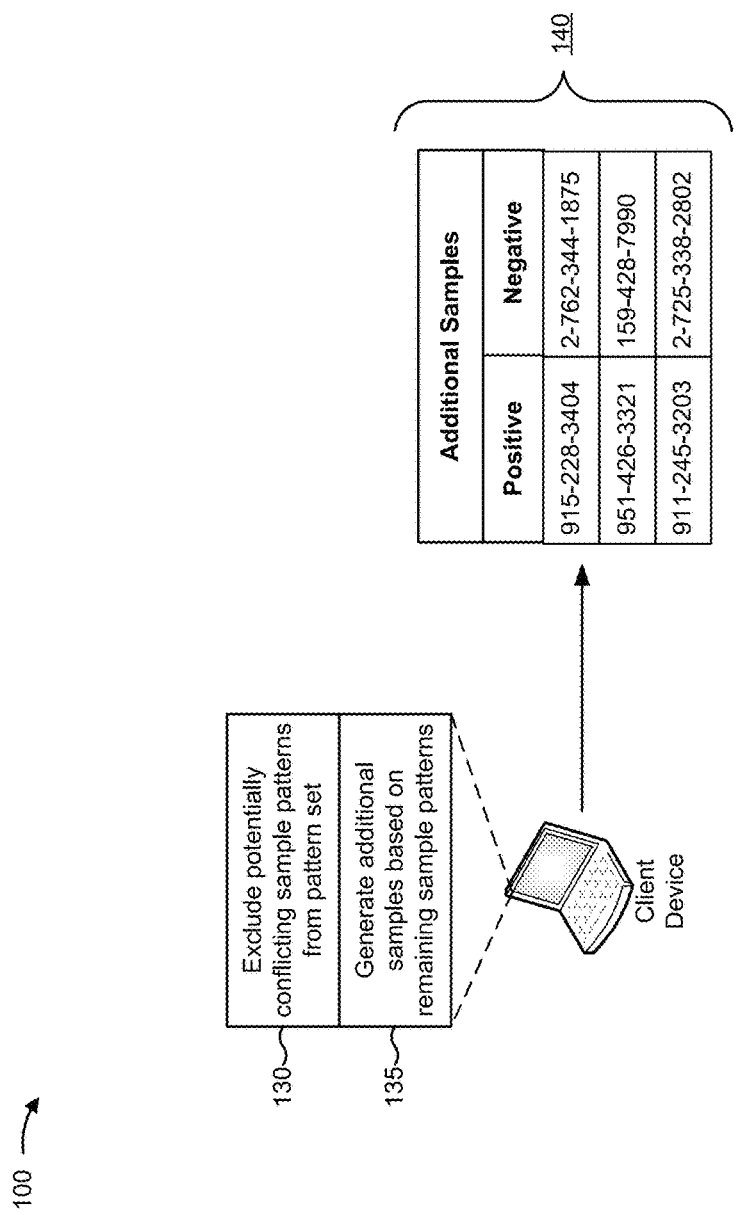

FIGS. 1A and 1B are diagrams of an overview of an example implementation 100 described herein. As shown in FIG. 1A, and by reference number 105, a client device may receive a data set including positive samples and negative samples. In some implementations, the data set may include only positive samples, only negative sample, or other types of samples not associated with positive test data and/or negative test data. For example, the data set may include samples associated with one or more different groups other than a positive sample group or a negative sample group.

As shown by reference number 110, the client device may identify positive sample patterns, negative sample patterns, and potentially conflicting sample patterns. The client device may determine the sample patterns based on identifying structural unit values in the samples. A structural unit is a characteristic of a sample that can be used to identify patterns associated with the sample. For example, a structural unit for a telephone number sample may include a country code, an area code, a single digit, a group of digits, or the like. In some implementations, structural units may be standardized across different samples of a particular sample type. In some implementations, the client device may generate a structural representation (e.g., a directed graph) corresponding to each sample based on identifying the structural unit values, and may identify the patterns based on the structural representations, as described in more detail elsewhere herein.

A positive sample pattern may include a rule that identifies potential structural unit values and/or arrangements of structural unit values to be used when generating positive samples. Similarly, a negative sample pattern may include a rule that identifies potential structural unit values and/or arrangements of structural unit values to be used when generating negative samples. A potentially conflicting sample pattern may include a rule that is associated with both a positive sample pattern and a negative sample pattern. That is, the potentially conflicting sample pattern, when used to generate an additional sample, may cause the client device to generate an additional sample including a structural unit value that has been included in both a positive sample and a negative sample.

As shown by reference number 115, the positive sample patterns may include structural unit values that have been detected in one or more positive samples. For example, here, five of the positive samples include a first digit, after a country code, of "9," so the positive sample patterns identify a first digit, after the country code, of "9" as a positive sample pattern. Here, no country codes are present in the positive samples. The value "9" may be associated with a structural unit corresponding to a telephone number sample type. As another example, based on two of the positive samples being associated with area codes of "951," the positive sample patterns identify the area code of "951." In some implementations, a structural unit value that is used in one or more positive samples may be identified by a positive sample pattern.

As shown by reference number 120, the negative sample patterns may include structural unit values that are present in one or more negative samples. For example, here, two of the negative samples includes a first digit, after the country code, of "1," and two of the negative samples include a first digit, after the country code, of "7," so the client device identifies negative sample patterns identifying the first digits, after the country code, of "1" and "7." As another example, three of the negative samples are associated with country codes of "2," so the client device identifies a negative sample pattern identifying the country code of "2." In some implementations, a structural unit value that is used in one or more negative samples may be identified by a negative sample pattern.

As shown by reference number 125, the potentially conflicting sample patterns may include structural unit values that are present in one or more positive samples and in one or more negative samples. For example, two positive samples and one negative sample have a first digit, after the country code, of "4," and one positive sample and one or more negative samples have a first digit, after a country code, of "6," so the client device identifies potentially conflicting sample patterns identifying the first digits of "4" and "6."

As shown in FIG. 1B, and by reference number 130, the client device may exclude the potentially conflicting sample patterns from the pattern set. For example, the client device may remove "First digit: 4" and "First digit: 6" from the positive sample patterns and from the negative sample patterns. As shown by reference number 135, the client device may generate additional samples based on the remaining sample patterns.

As shown by reference number 140, the additional samples may include structural unit values that are determined based on structural unit values of data set 105 of FIG.

1A and based on the sample patterns. For example, based on the potentially conflicting sample patterns identifying first digits, after the country code, of "4" and "6," the client device may generate positive samples and negative samples that do not have first digits, after the country code, of "4" or "6." As another example, based on the positive sample patterns identifying a first digit, after the country code, of "9" and an area code of "951," the client device may generate positive samples that have first digits, after the country code, of "9" and/or that have area codes of "951." As yet another example, based on the negative sample patterns identifying a country code of "2" and first digits, after the country code, of "1" and "7," the client device may generate additional negative samples that have first digits, after the country code, of "1" or "7" and/or that are associated with a "2" country code. In some implementations, the client device may generate at least one additional negative sample including each structural unit value that was detected in one of the negative samples.

In this way, a client device generates positive samples and/or negative samples based on a data set, without having prior information regarding requirements corresponding to the positive samples and/or the negative samples. Furthermore, the client device determines pattern information regarding positive samples, negative samples, and potentially conflicting samples, which reduces a quantity of false positive or false negative samples generated by the client device, thereby conserving processor and/or storage resources of the client device and resulting in fewer software errors.

As indicated above, FIGS. 1A and 1B are provided merely as an example. Other examples are possible and may differ from what was described with regard to FIGS. 1A and 1B.

Figure 2:
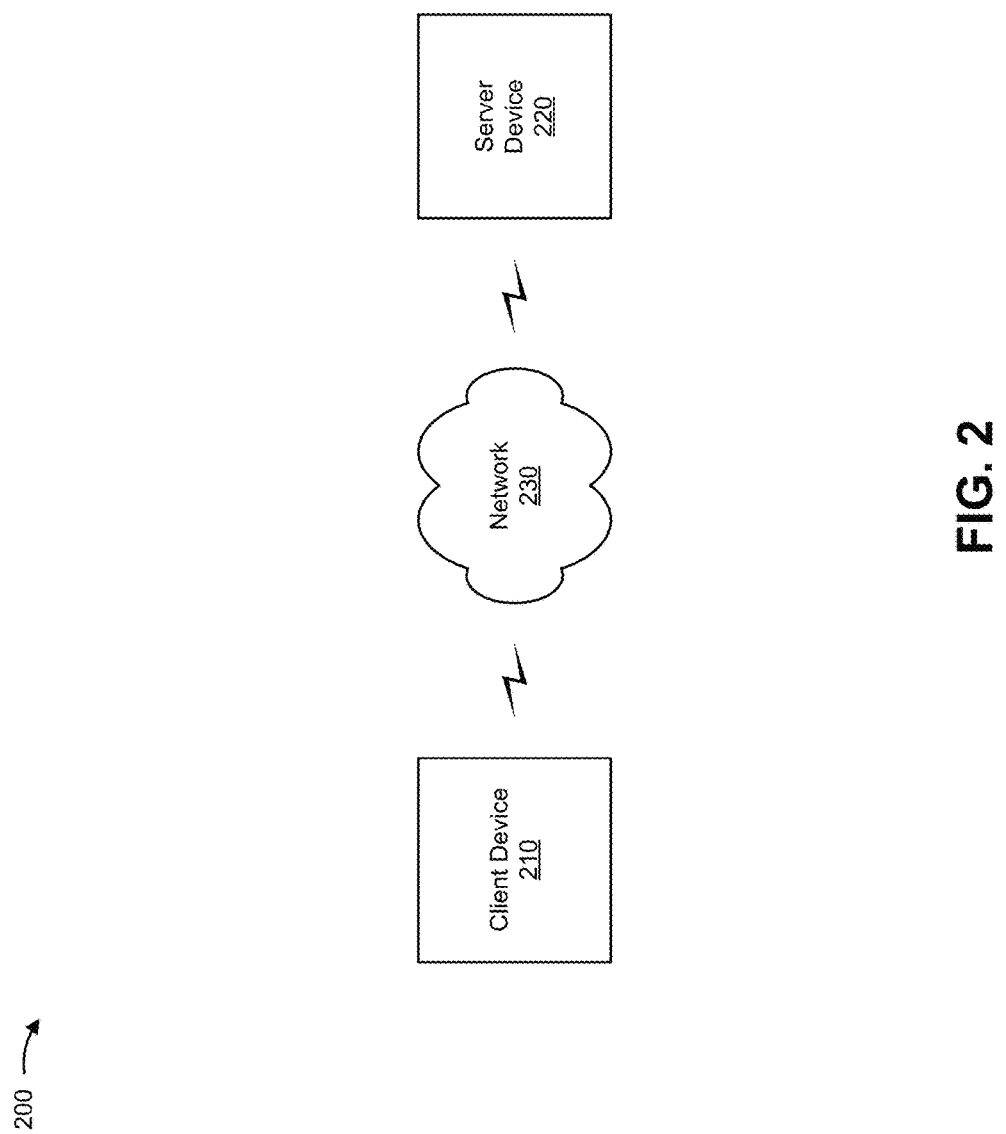
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing information (e.g., information associated with natural language processing, as described herein). For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may receive information from and/or transmit information to another device in environment Server device 220 may include one or more devices capable of receiving, generating, storing, processing, and/or providing information (e.g., information associated with natural language processing, as described herein). In some implementations, server device 220 may include a communication interface that allows server device 220 to receive information from and/or transmit information to other devices in environment 200.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
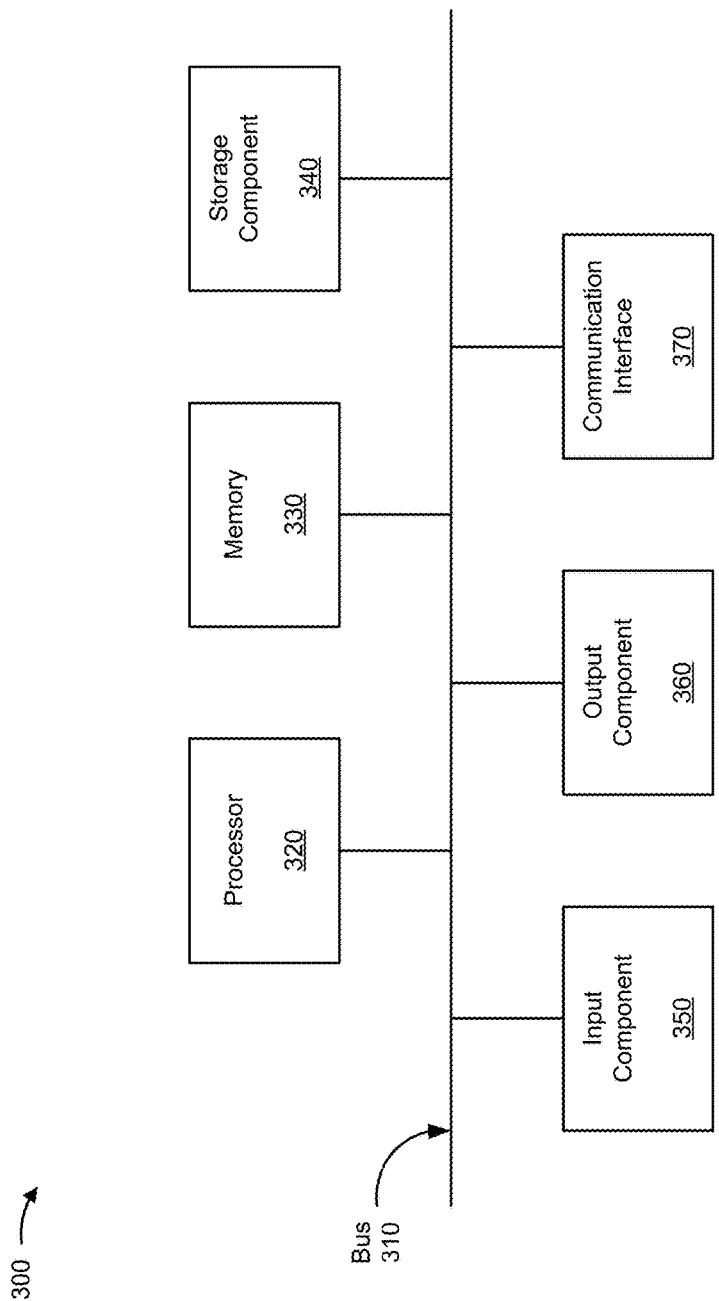
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
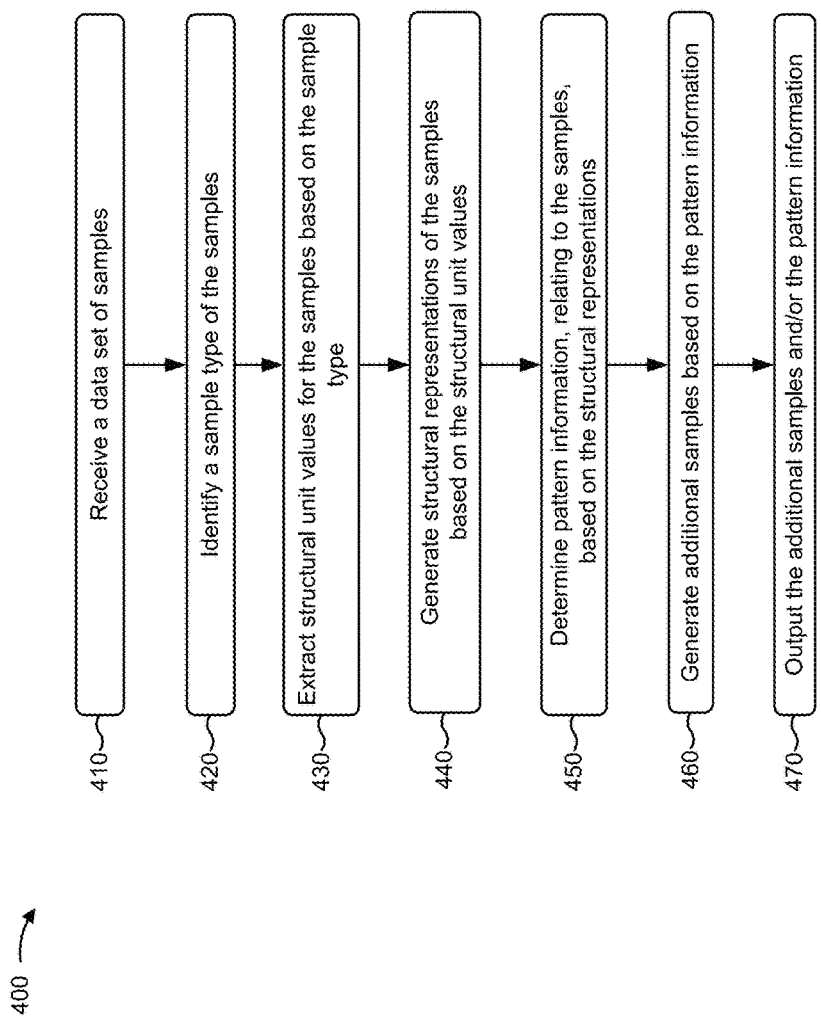
FIG. 4 is a flow chart of an example process for generating additional samples based on a data set of samples.

FIG. 4 is a flow chart of an example process 400 for generating additional samples based on a data set of samples. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a data set of samples (block 410). For example, client device 210 may receive a data set that includes multiple, different samples. In some cases, the samples may each be associated with the same group. For example, the samples may all be positive samples, may all be negative samples, or may all be associated with a different type of group other than positive samples or negative samples. In some cases, a first subset of the samples may be associated with a first group (e.g., a positive sample group) and a second subset of the samples may be associated with a second group (e.g., a negative sample group). The samples may include, for example, network addresses (e.g., email addresses, Internet Protocol (IP) addresses, Uniform Resource Identifiers (URIs), Uniform Resource Locators (URLs), media access control (MAC) addresses, etc.), physical addresses, strings, numbers, telephone numbers, sentences, names, or any other textual information.

A positive sample group may include samples that satisfy a criterion or a group of criteria. For example, the positive sample group may include test data that satisfies input requirements for a program to be tested. A negative sample group may include samples that do not satisfy the criterion or the group of criteria (or that satisfy a different criterion or a different group of criteria). For example, the negative sample group may include test data that does not satisfy the input requirements of the program to be tested. In some implementations, a set of samples may be associated with a group other than a positive sample group or a negative sample group. For example, the set of samples may be grouped based on any characteristic of the set of samples.

In some implementations, client device 210 may receive the data set from server device 220. For example, server device 220 may provide the data set to client device 210 for client device 210 to generate additional samples based on the data set. In a case where the data set includes samples of multiple, different groups, server device 220 may provide information identifying groups associated with the multiple, different samples. In some implementations, client device 210 may receive the data set and/or other information based on user input received by client device 210. For example, the user may input the data set, may input information identifying groups corresponding to the samples, or the like.

In some implementations, the roles described herein with respect to client device 210 and server device 220 may be reversed. For example, server device 220 may receive the data set from client device 210, may generate additional samples based on the data set, etc.

As further shown in FIG. 4, process 400 may include identifying a sample type of the samples (block 420). For example, client device 210 may identify a sample type associated with the samples. The sample type of a sample may identify a classification of the sample (e.g., a network address sample, a physical address sample, a string sample, a number sample, a telephone number sample, a sentence sample, a name sample, etc.), and may be associated with one or more structural units that are possibly included in the sample. In some implementations, client device 210 may determine the sample types automatically (e.g., without user input). For example, client device 210 may parse the data set to identify information included in the samples, and may identify the sample type based on the information included in the samples. As another example, client device 210 may assume that a sample is a particular sample type (e.g., a string sample type, a number sample type, etc.) unless client device 210 receives input defining another sample type.

In some implementations, client device 210 may determine the sample types based on user input that indicates the sample types, or based on receiving information identifying the sample types in association with the samples (e.g., from server device 220, from another client device 210, etc.), which may conserve processor resources of client device 210 that would otherwise be used to identify the samples.

In some implementations, client device 210 may determine that the data set includes samples of multiple, different sample types. In such a case, client device 210 may remove samples other than those associated with a particular sample type, thus conserving processor resources that would otherwise be used to process the removed samples. Additionally, or alternatively, client device 210 may group the samples based on sample type and may process samples of one or more of the groups, which may conserve processor resources that would otherwise be used to process all of the samples in the data set. Additionally, or alternatively, client device 210 may remove samples not associated with one of multiple, different identified sample types. Additionally, or alternatively, client device 210 may fail to classify one or more samples (e.g., based on the samples being associated with an unknown sample type, based on the samples being corrupted, incomplete, or erroneous, etc.), and may remove the one or more samples.

As further shown in FIG. 4, process 400 may include extracting structural unit values for the samples based on the sample type (block 430). For example, client device 210 may identify structural unit values for the samples of the data set. A structural unit value may include a value (e.g., a string, a number, etc.) corresponding to a structural unit of a sample. A structural unit may include a characteristic of a sample, to be used to determine relationships between samples of a data set. For example, a structural unit of a string sample type may include a character (e.g., an uppercase character, a lowercase character, a number, a symbol, etc.), a character in a particular sequential position of the string, a length of the string, or the like. As another example, a structural unit of a number sample type may include a digit, a digit in a particular sequential position of the number, a length of the number, or the like.

As yet another example, a structural unit of a phone number may include information identifying a country code, an area code, a single digit, a group of digits, or the like. As still another example, a structural unit of a uniform resource locator (URL) may include information identifying a scheme (e.g., https, http, ftp, mailto, etc.), a username, a password, a node (e.g., www, public, books, oia, etc.), a subdomain, a domain, an extension, a country code, a port, a path, a query, a fragment, or the like.

As yet another example, a structural unit of a physical address may include information identifying a geographical location, a country, a state, a city, a district, an area, a ZIP code, a PIN code, a house number, a building number, a building name, or the like. Other examples of structural units and sample types are possible, and implementations described herein are not intended to be limited to the structural units and sample types described above.

A sample may include one or more structural unit values. For example, a URL sample may include structural unit values corresponding to any one or more of a scheme, a username, a password, a node, a subdomain, a domain, an extension, a country code, a port, a path, a query, or a fragment. Continuing the above example, structural unit values corresponding to the domain and extension structural units may include "example.com," where "example" corresponds to the domain structural unit and ".com" corresponds to the extension structural unit.

Some structural units may be composite structural units. A composite structural unit may refer to a structural unit that includes multiple, different sub-units (i.e., multiple, different structural units). For example, a host name structural unit may include any two or more of a node sub-unit, a subdomain sub-unit, a domain sub-unit, an extension sub-unit, and/or a country code sub-unit, as described in more detail in connection with FIG. 6B. As another example, a user name structural unit for an email address may include one or more character sub-units, which may be associated with sequential positions in the user name structural unit.

In some implementations, client device 210 may identify structural unit values based on parsing the samples. For example, client device 210 may use regular expressions or a similar logical parsing language to identify structural unit values. In some implementations, client device 210 may process the samples based on the identified structural units. For example, client device 210 may add separating characters between the identified structural units, may add the structural units to a data structure, may remove characters not associated with a structural unit, or the like.

As further shown in FIG. 4, process 400 may include generating structural representations of the samples based on the structural unit values (block 440). For example, client device 210 may generate structural representations of the samples based on the structural unit values. In some implementations, client device 210 may generate structural representations corresponding to samples of the data set. Additionally, or alternatively, client device 210 may discard one or more samples of the data set, and may not generate structural representations for discarded samples (e.g., based on the discarded samples being incomplete, being associated with a particular sample type, being associated with a particular group of samples, etc.). By discarding samples, client device 210 conserves processor resources that would otherwise be used to generate structural representations for the discarded samples.

In some implementations, the structural representations may include directed graphs (e.g., annotated directed graphs, directed hypergraphs, annotated directed multi-hypergraphs, etc.). For example, a directed graph may include nodes corresponding to data points (e.g., structural units) and edges describing relationships between the data points. The nodes of a directed graph corresponding to a particular sample may be generated based on a sample type of the particular sample. For example, when the particular sample is a URL, the directed graph corresponding to the particular sample may have nodes relating to one or more of a scheme, a username, a password, a node, a subdomain, a domain, an extension, a country code, a port, a path, a query, and/or a fragment, based on which of the above structural units are included in the particular sample.

When generating a directed graph for a sample, client device 210 may generate a quantity of empty nodes equal to a quantity of structural units included in the sample, and may assign structural unit values to the nodes and/or generate edges between the nodes based on structural units included in the sample. For example, assume that a sample includes ten structural units. In that case, client device 210 may generate a directed graph with ten empty nodes, may extract structural unit values corresponding to each of the ten empty nodes, and may associate the extracted structural unit values with the corresponding nodes.

In some implementations, one or more nodes of a directed graph may be mandatory nodes. A mandatory node may identify a structural unit that must be included in a sample corresponding to the directed graph for the sample to be considered a valid sample. Additionally, or alternatively, a mandatory node may identify a structural unit that is to be included in all additional samples that are generated based on a data set.

For example, assume that a URL sample must include a domain structural unit to be regarded a valid, or usable, URL. In such a case, the domain structural unit may be associated with a mandatory node. When client device 210 determines that a particular sample does not include a structural unit corresponding to a mandatory node, client device 210 may discard the particular sample, may generate an additional sample to replace the particular sample, may prevent the particular sample from being used to determine pattern information, or the like. In this way, client device 210 improves accuracy of the generated samples and conserves processor resources that would otherwise be used to perform additional processing of non-conforming samples.

In some implementations, one or more nodes of a directed graph may be optional nodes. An optional node may be associated with a structural unit that may, or may not, be included in a sample that is used to generate additional samples. In other words, a sample that does not include a structural unit associated with an optional node may nevertheless be used to generate additional samples. For example, a date sample may include any one or more of a day structural unit, a month structural unit, or a year structural unit. Each of the structural units of the date sample may be associated with corresponding optional nodes in a directed graph.

In some implementations, a node may be associated with a value range that identifies potential structural unit values of a corresponding structural unit. For example, for a base-10 numeric structural unit, the value range may include digits from the set {0, 1, . . . , 9}. As another example, for a date sample type, a value range of a node corresponding to a day structural unit may include digits from the set {1, 2, . . . , 31}.

In some implementations, two or more nodes may be associated with hierarchy levels. For example, when client device 210 determines that a first structural unit is always followed by a second structural unit in a set of samples, client device 210 may associate the first structural unit with a first hierarchy level and the second structural unit with a second hierarchy level that is lower than the first hierarchy level. In such a case, when generating additional samples based on the set of samples, client device 210 may include the first structural unit in each additional sample that includes the second structural unit, and may include the second structural unit in each additional sample that includes the first structural unit.

In some implementations, client device 210 may determine that a particular sample does not include a node based on hierarchy levels. For example, assume that a first node and a second node are related by a first hierarchy level and a second, lower hierarchy level. Assume further that a sample includes a structural unit corresponding to the first node and does not include a structural unit corresponding to the second node. In that case, client device 210 may discard the sample, may generate an additional sample, or the like. In this way, client device 210 improves accuracy of generated samples and conserves resources that would otherwise be used to test non-conforming samples. For example, when non-conforming samples are used to test a computer program, results of testing the computer program may be inaccurate, thereby causing increased errors in the computer program and requiring additional troubleshooting and/or testing of the computer program.

In some implementations, edges of a directed graph may be associated with edge types. For example, when structural units corresponding to a first node and a second node both appear in each sample of a set of samples, client device 210 may connect the first node and the second node with an edge of an "AND" edge type. As another example, when only one of the structural units corresponding to the first node and the second node appears in each sample, client device 210 may connect the first node and the second node with an "XOR" edge type. As yet another example, when at least one of the structural units corresponding to the first node and the second node appear in each sample, client device 210 may connect the first node and the second node with an "OR" edge type. Other edge types are possible, and are described in more detail elsewhere herein.

In some implementations, client device 210 may generate a directed edge when a structural unit associated with a first node is followed by a structural unit associated with a second node. For example, when client device 210 generates a directed graph for a date sample that uses the format of (month, day, year), the directed graph may include a month node associated with a directed edge to a day node, and the day node may be associated with a directed edge to a year node, reflecting the order of structural units in the date sample. Client device 210 may use the directed edges to determine an order of structural units based on which to generate additional samples, as described in more detail below.

As further shown in FIG. 4, process 400 may include determining pattern information, relating to the samples, based on the structural representations (block 450). For example, client device 210 may determine pattern information, relating to the samples, based on the structural representation. The pattern information may identify structural unit values that have been extracted from the samples, and may indicate a formatting and/or an arrangement of structural units of the samples. Client device 210 may use the pattern information to generate additional samples, as described in more detail below.

In some implementations, the pattern information may identify structural unit values that have been extracted from a data set of samples. For example, assume that a set of samples includes a first structural unit, a second structural unit, and a third structural unit. The pattern information may identify structural unit values extracted based on the first structural unit, structural unit values extracted based on the second structural unit, and/or structural unit values extracted based on the third structural unit.

In some implementations, the pattern information may include rules indicating whether to include or exclude structural units when generating an additional sample. For example, when a particular structural unit is an optional structural unit, client device 210 may determine a ratio of samples, that include the particular structural unit, to samples that do not include the particular structural unit. Client device 210 may associate the particular structural unit with the ratio, and may use the ratio to determine a quantity of additional samples that are to include the particular structural unit, as described in more detail below. As another example, when a particular structural unit is a mandatory structural unit, client device 210 may determine pattern information indicating whether to include a structural unit value corresponding to the particular structural unit in each additional sample.

In some implementations, client device 210 may determine pattern information for multiple, different groups of samples. For example, client device 210 may determine pattern information for a group of positive samples and for a group of negative samples. The pattern information for the group of positive samples may identify structural unit values present in the positive samples and/or relationships between structural units of the positive samples. Similarly, the pattern information for the group of negative samples may identify structural unit values present in the negative samples and/or relationships between structural units of the negative samples.

In some cases, a structural unit may be associated with one or more conflicting structural unit values. A conflicting structural unit value may refer to a structural unit value that is present in samples of at least two groups of samples, when the at least two groups of samples are each associated with the same sample type. For example, client device 210 may identify a conflicting structural unit value for an address sample type when one or more samples of a first group and one or more samples of a second group are associated with the same country structural unit value.

When identifying pattern information, client device 210 may identify conflicting structural unit values. For example, for a particular structural unit that is included in the first group and the second group (e.g., a positive sample group and a negative sample group), client device 210 may identify a first set of structural unit values that are included in only the first group, a second set of structural unit values that are included in only the second group, and a third set of structural unit values that are included in the first group and the second group. The third set of structural unit values may identify the conflicting structural unit values. Client device 210 may exclude a particular structural unit value from the first set when the particular structural unit value is also included in the third set. Additionally, or alternatively, client device 210 may exclude a particular structural unit value from the second set when the particular structural unit value is also included in the third set. In this way, client device 210 improves accuracy of generated samples.

In some implementations, client device 210 may determine pattern information for a string sample type. A string sample may include one or more characters. Each sequential character of a string may be associated with a different structural unit. For example, a first character of a string may be associated with a first structural unit, a second character of a string may be associated with a second structural unit, and so on. Client device 210 may identify character structural unit values for each structural unit of the string. For example, assume that a data set includes three strings: "first," "second," and "third." In that case, first structural unit values of the three strings may include "f", "s," and "t," and second structural unit values of the three strings may include "i," "e", and "h." Client device 210 may identify the structural unit values based on directed graphs corresponding to the three strings. For example, the directed graphs may each have first nodes corresponding to the respective first characters, second nodes corresponding to the respective second characters, and so on.

In some implementations, client device 210 may determine string length information for a set of string samples. For example, client device 210 may determine an average length of strings in the set, a median length, a mode of the length, a minimum string length, a maximum string length, or the like. Client device 210 may use the string length information to determine lengths of strings generated as additional samples, as described in more detail below. In some implementations, client device 210 may determine conflicting structural unit values between groups of string samples, and may use the conflicting structural unit values to generate additional string samples, as is also described in more detail below.

In some implementations, client device 210 may determine pattern information for a number sample type. For example, client device 210 may determine a smallest number present in a set of number samples, a largest number present in the set of sample numbers, a value range based on the smallest number and the largest number, a smallest length (in digits) of a number sample, a largest length (in digits) of a number sample, a length value range based on the smallest length and the largest length, or the like. Additionally, or alternatively, client device 210 may determine structural unit values for each digit in a number sample. For example, assume that a set of three number samples includes "298105482," "2018045," and "108508230." In that case, client device 210 may identify a number value range for the numbers of 2018045 through 298105482, a length value range of the lengths of 7 through 9, or the like.

In some implementations, client device 210 may identify conflicting structural unit values between two or more groups of number sample types. For example, assume that client device 210 determines pattern information for a first group of number samples and a second group of number samples. Assume that the pattern information identifies a first number value range and a first length value range for the first group, and assume that the pattern information identifies a second number value range and a second length value range for the second group. Client device 210 may determine the conflicting structural unit values based on overlap between the respective number value ranges and length value ranges. For example, when one or more numbers in the first number value range are included in the second number value range, client device 210 may identify conflicting structural unit values corresponding to the one or more numbers. As another example, when the second number value range is included in the first number value range, client device 210 may identify each number of the second number value range as conflicting structural unit values.

In some implementations, client device 210 may determine pattern information for a date sample type. The pattern information for the date sample type may identify a formatting of samples (e.g., month/day/year, day/month/year, month-day-year, year-month-day, a Unix time value, whether months are represented as strings or as numbers, etc.). Additionally, or alternatively, the pattern information for the date sample type may identify dates that are included in the data set. When the pattern information relates to multiple, different groups of date samples, the pattern information may identify structural unit values that are included in each of the multiple, different groups, and may identify conflicting structural unit values that are present in two or more of the multiple, different groups. For example, when a sample corresponding to a particular date is present in two or more of the groups, client device 210 may add the particular date to a set of conflicting structural unit values.

In some implementations, client device 210 may determine pattern information for an email address sample type. For example, client device 210 may detect structural units in an email address sample based on placement of an "@" symbol in the email address sample. A first portion of the email address preceding the "@" symbol (e.g., a user name structural unit) may be processed similarly to a string sample, as described in more detail above. For example, client device 210 may associate each sequential character of the user name structural unit with a different character structural unit. A second portion following the "@" symbol (e.g., a host name structural unit) may be associated with one or more sub-units (e.g., a node sub-unit, a sub-domain sub-unit, a domain sub-unit, an extension sub-unit, a country code sub-unit, etc.). Client device 210 may determine pattern information describing relationships between structural unit values of the sub-units, a quantity of additional samples in which to include the structural unit values of the sub-units, or the like, as described in more detail above.

In some implementations, client device 210 may determine pattern information for a physical address sample type based on the structural representations. In some implementations, physical address samples may be associated with a particular hierarchy of structural units. For example, a country structural unit may be associated with a higher hierarchical level than a state structural unit, and the state structural unit may be associated with a higher hierarchical level than a city structural unit.

Continuing the above example, client device 210 may determine an overlap threshold for the group of structural units. An overlap threshold may identify a hierarchical level at which, and/or above which, each structural unit of the group is associated with the same structural unit values. For example, if each structural unit of a group identifies physical addresses in Fairfax, Va., the overlap threshold may identify the structural unit value of "Fairfax." Client device 210 may use the overlap threshold to generate additional samples, as described in more detail below.

As further shown in FIG. 4, process 400 may include generating additional samples based on the pattern information (block 460). For example, client device 210 may generate additional samples based on the pattern information. The additional samples for a particular data set may be generated based on samples included in the particular data set. For example, client device 210 may receive the data set, may generate pattern information based on structural unit values of the data set, and may generate additional samples based on the pattern information and the structural unit values.

The additional samples may include structural unit values that are included in at least one of the samples of the data set. For example, when a structural unit of a data set is associated with three different structural unit values, client device 210 may select one of the three different structural unit values to include in an additional sample. In some implementations, client device 210 may randomly select a structural unit value to include in an additional sample. Additionally, or alternatively, client device 210 may select the structural unit value based on a frequency of occurrence of the structural unit value in the data set. For example, if a first structural unit value occurs in 60 percent of samples of the data set and a second structural unit value occurs in 40 percent of the samples of the data set, client device 210 may select the first structural unit value to include in 60 percent of the additional samples and may select the second structural unit value to include in 40 percent of the additional samples.

In some implementations, client device 210 may generate additional samples based on conflicting structural unit values. For example, assume that client device 210 generates first additional samples based on pattern information corresponding to a first group of samples, and assume that client device 210 generates second additional samples based on pattern information corresponding to a second group of samples. When the first group of samples and the second group of samples include conflicting structural unit values, client device 210 may exclude the conflicting structural unit values from the first additional samples or the second additional samples. In this way, client device 210 improves accuracy of the additional samples. For example, when client device 210 generates additional samples that include conflicting structural unit values, client device 210 may generate false positive and/or false negative additional samples based on client device 210 having insufficient information to determine accurate rules for whether a conflicting structural unit value should be included in a positive sample or in a negative sample. By improving accuracy of the additional samples, client device 210 improves accuracy of the software testing process by reducing a likelihood that false positive samples or false negative samples are used to test software.

In some implementations, each structural unit value associated with a particular structural unit may be a conflicting structural unit value. In that case, if the structural unit is an optional structural unit, client device 210 may omit the structural unit from the additional samples, which conserves processor resources that would otherwise be used to generate the optional structural unit. Additionally, or alternatively, if the structural unit is a mandatory structural unit, client device 210 may use one or more of the conflicting structural unit values when generating the additional samples, which increases a quantity of additional samples, thereby improving testing of software applications.

In some implementations, client device 210 may generate additional samples with structural units in a particular order based on pattern information. For example, the pattern information may indicate that samples of a data set are associated with a particular order of structural units, and client device 210 may generate the additional samples to include structural unit values in the particular order. Additionally, or alternatively, the pattern information may indicate that the structural units of the data set are associated with multiple, different orders, and client device 210 may generate additional samples based on the multiple, different orders.

In some implementations, client device 210 may generate additional samples of different lengths. For example, when a data set includes samples of multiple, different lengths, client device 210 may generate additional samples within a length value range of the data set. Client device 210 may select lengths of the additional samples randomly, based on a frequency of occurrence of lengths in the data set, or the like.

In some implementations, client device 210 may generate the additional samples automatically (e.g., without user input). For example, client device 210 may determine that one or more samples is missing or incomplete, may determine that the data set does not include a threshold quantity of samples, or the like, and may accordingly generate one or more additional samples. In some implementations, client device 210 may receive information identifying a quantity of additional samples to generate (e.g., a user instruction, an instruction from server device 220, etc.), and may generate the quantity of additional samples based on the instruction, which may conserve processor resources of client device 210.

In some implementations, client device 210 may generate additional samples based on data relating to a sample type. For example, when generating additional samples of a physical address sample type, client device 210 may use information identifying physical addresses to generate part of, or all of, the additional samples. In such a case, client device 210 may generate additional samples based on an overlap threshold. For example, assume that the physical address sample type includes a street address structural unit, a city structural unit, a state structural unit, and a country structural unit. Assume further that all samples, of a data set of physical address samples, are located in the same state and country. In that case, client device 210 may identify the state structural unit as the overlap threshold for the data set. Based on information identifying physical addresses located in the same state and country as the data set of physical address samples, client device 210 may generate additional samples. For example, client device 210 may generate additional samples using known physical addresses in the same state and country as the data set of physical address samples. In this way, client device 210 improves variety of the additional samples (thereby improving testing) and conserves processor resources.

In some implementations, client device 210 may generate additional samples for a negative sample group based on a data set of positive samples, or may generate additional samples for a positive sample group based on a data set of negative samples. For example, assume that client device 210 receives a sample set of positive samples. Client device 210 may generate structural representations corresponding to the positive samples, and may determine pattern information describing the positive samples. To generate additional negative samples, client device 210 may generate additional samples that violate one or more rules identify by the pattern information. For example, if the pattern information indicates that a number sample is to be within a particular value range, client device 210 may generate additional samples that are outside the particular value range. In this way, client device 210 conserves processor and/or storage resources that would otherwise be used to store and/or receive negative samples.

As further shown in FIG. 4, process 400 may include outputting the additional samples and/or the pattern information (block 470). For example, client device 210 may output the additional samples and/or the pattern information. In some implementations, client device 210 may provide the additional samples and/or the pattern information to server device 220 (e.g., for storage, for processing, etc.). In some implementations, when the samples include positive samples and/or negative samples, client device 210 may provide the samples for input to a program to be tested.

In some implementations, client device 210 may provide the additional samples and/or pattern information for display to a user, and may receive information from the user (e.g., based on user input) regarding the additional samples and/or the pattern information. For example, the user may provide information indicating whether the additional samples and/or the pattern information is accurate. In some implementations, client device 210 may adjust the additional samples and/or the pattern information based on the information received from the user. For example, when the information received from the user indicates that the pattern information and/or the additional samples are incorrectly generated, client device 210 may adjust the pattern information and/or the additional samples (e.g., based on a neural network algorithm, a machine learning algorithm, etc.). In this way, client device 210 improves accuracy of the additional samples.

In some implementations, client device 210 may test a computer program using the additional samples. For example, client device 210 may automatically input the additional samples to the computer program, may determine a result of inputting the additional samples, and may store and/or provide information identifying the result. Additionally, or alternatively, client device 210 may generate a report on the additional samples. The report may identify which pattern information and/or structural units were used to generate the additional samples, may identify a quantity of additional samples that can be generated based on the data set of samples, or the like. Additionally, or alternatively, client device 210 may selectively adjust the pattern information, or generate one or more other samples based on the pattern information, based on whether the computer program accepts the one or more additional samples or rejects the one or more additional samples. For example, client device 210 may adjust the pattern information when the computer program rejects the one or more additional samples, and client device 210 may generate the one or more other samples based on the pattern information when the computer program accepts the one or more additional samples.

In this way, client device 210 generates additional samples based on extracting structural unit values from a data set of samples and detecting patterns in the structural unit values. Thus, client device 210 saves processor and/or storage resources that would otherwise be used to specify the patterns in the structural unit values, improves debugging and testing of software applications, and saves orga-nization time and/or resources that would otherwise be used to manually determine the patterns and/or the additional samples.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
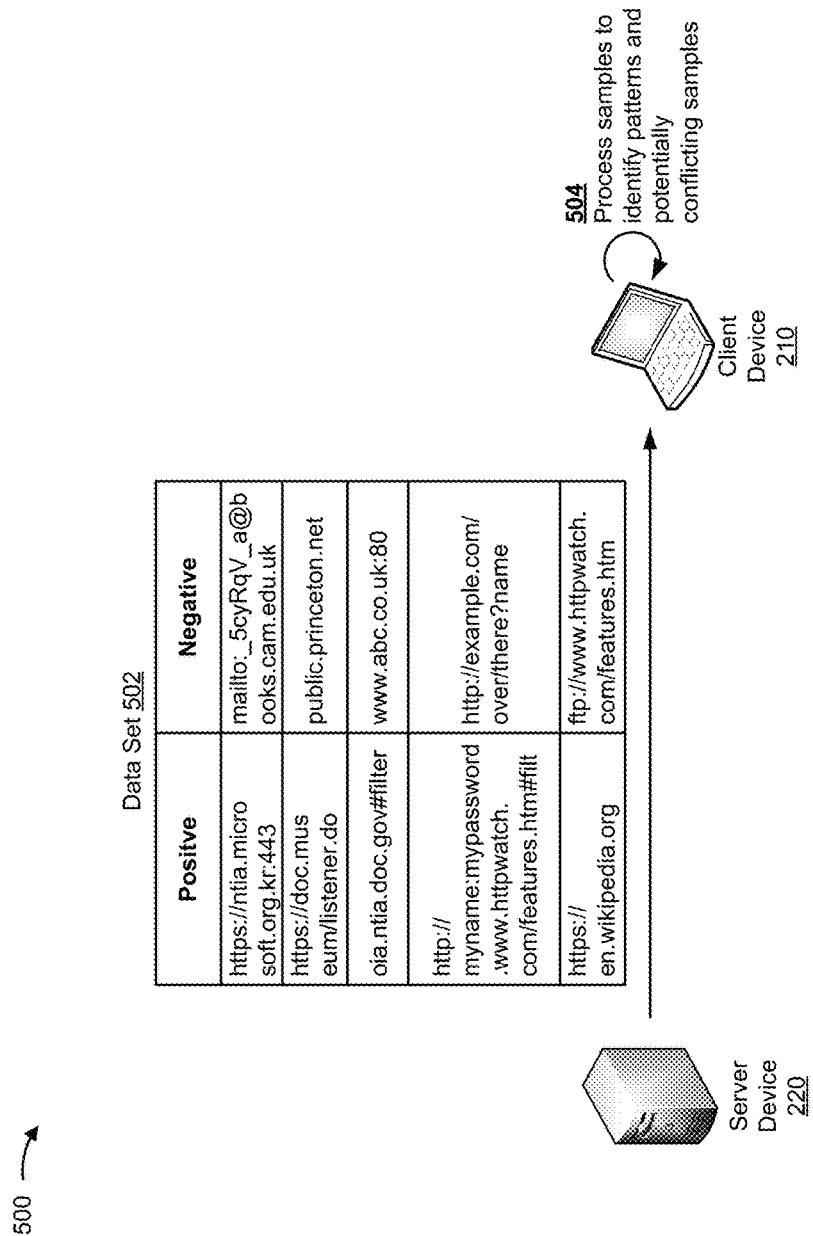

FIGS. 5A-5E are diagrams of an example implementation 500 relating to example process 400 shown in FIG. 4. FIGS. 5A-5E show an example of generating additional samples based on a data set of samples. As shown in FIG. 5A, and by reference number 502, client device 210 may receive a data set from server device 220. As shown, the data set may include a first group of positive samples (e.g., URLs that satisfy a set of criteria for input to a program) and a second group of negative samples (e.g., URLs that do not satisfy the set of criteria, or that satisfy a different set of criteria). As shown by reference number 504, client device 210 may process the data set of samples to identify patterns and potentially conflicting samples, as will be described in more detail below.

Figure 5B:
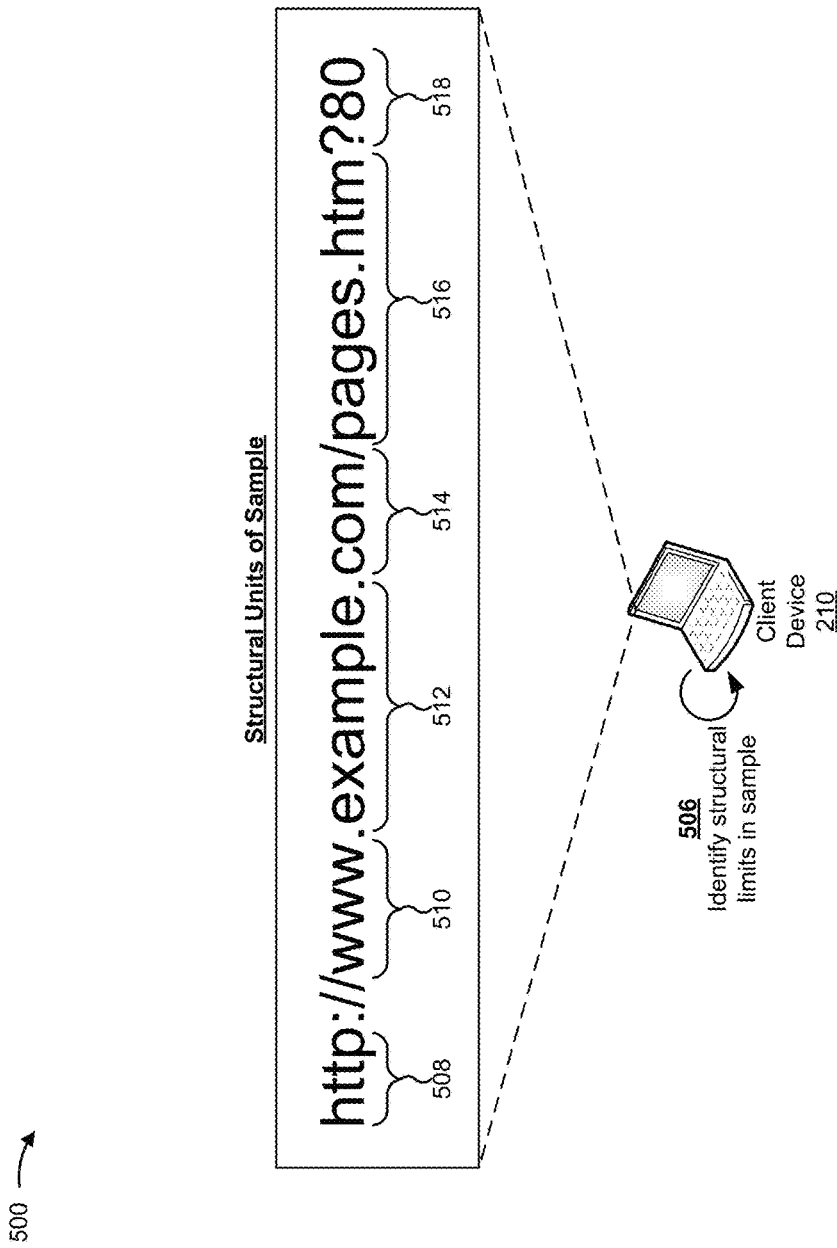

As shown in FIG. 5B, and by reference number 506, client device 210 may identify structural units in the samples. Here, structural units are shown by reference numbers 508 through 518. For example, the samples may include a scheme structural unit, as shown by reference number 508, and/or a node structural unit, as shown by reference number 510. As another example, the samples may include a host name structural unit, as shown by reference number 512, and/or an extension structural unit, as shown by reference number 514. As yet another example, the samples may include a path structural unit, as shown by reference number 516, and/or a port structural unit, as shown by reference number 518. Client device 210 may identify the structural units based on parsing the samples (e.g., based on regular expressions or a similar approach) and/or based on a sample type of the sample.

Figure 5C:
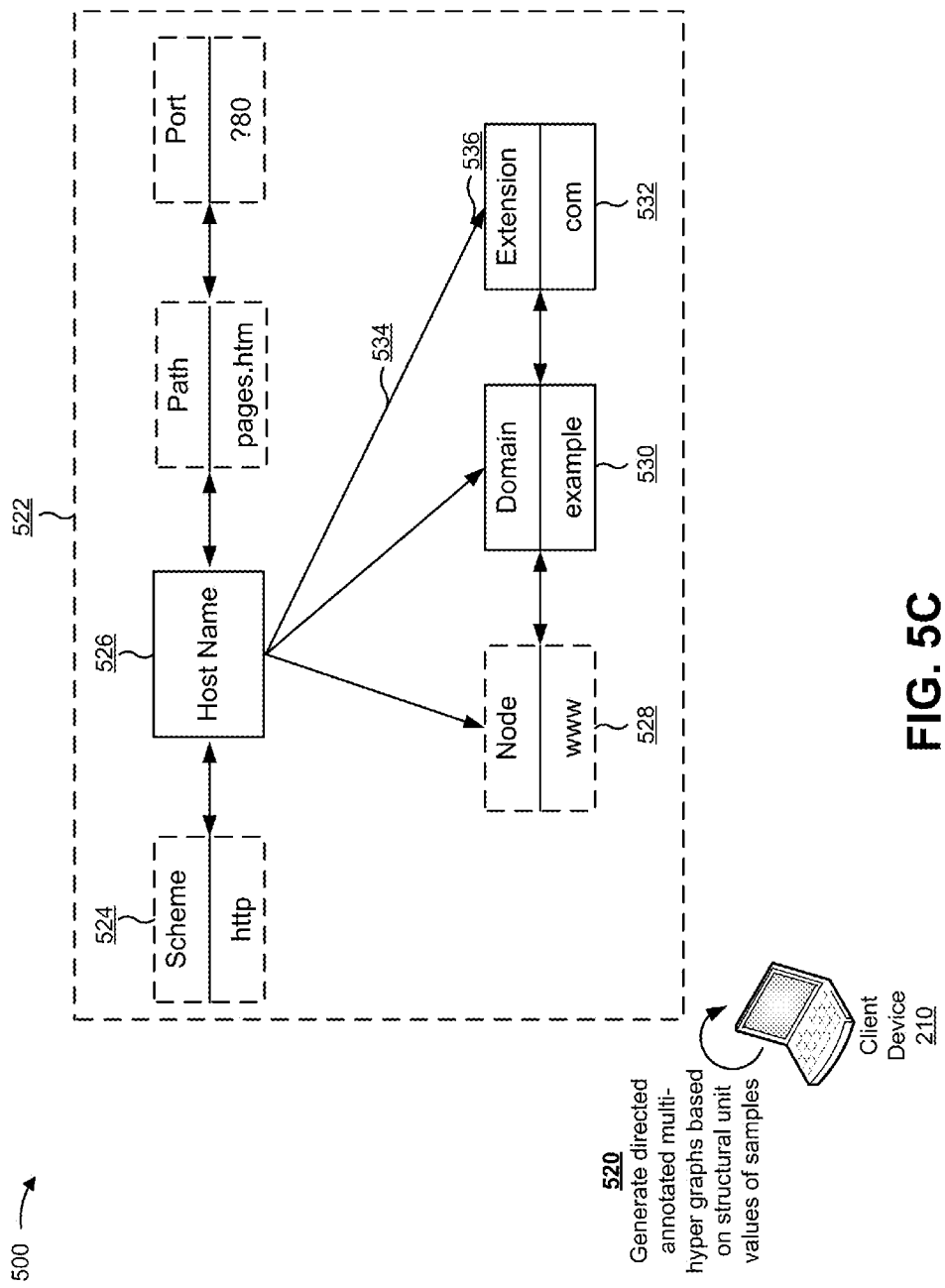

As shown in FIG. 5C, and by reference number 520, client device 210 may generate structural representations of the samples. Here, client device 210 generates directed annotated multi-hypergraphs based on the structural unit values of the samples. An example structural representation, corresponding to the sample described with regard to FIG. 5B, is illustrated by reference number 522. As shown, each structural unit of the sample is associated with a corresponding node. For example, the scheme structural unit is associated with node 524, and is associated with a structural unit value of "http." Other nodes and structural unit values are shown, and are not described in detail for brevity.

As further shown by reference number 524, some of the nodes may be optional nodes, and may be illustrated using a dashed border. Here, the scheme, node, path, and port structural units are associated with optional nodes. An optional node may correspond to a structural unit that may or may not be included in a sample of a data set. In some implementations, some of the nodes may be mandatory nodes (e.g., the host name node, the domain node, and the extension node) and may be illustrated using a solid border. A mandatory node may correspond to a structural unit that is included in every sample of a data set and/or in every additional sample generated based on the data set.

As shown by reference number 526, some nodes may be associated with composite structural units. For example, the host name structural unit may include a composite structural unit. As shown by reference numbers 528 through 532, the host name structural unit may be associated with sub-units. For example, the host name structural unit may be associated with a node structural unit, shown by reference number 528, a domain structural unit, shown by reference number 530, and an extension structural unit, shown by reference number 532, as sub-units. Here, the domain structural unit and the extension structural unit are associated with mandatory nodes, which are shown with solid (e.g., non-dashed) borders. As shown by reference number 534, the host name structural unit may be connected with the sub-units by directed edges. Furthermore, as shown by reference number 536, the directed edges may be associated with directions indicating the hierarchical relationship between the host name structural unit and the sub-units.

As shown in FIG. 5D, client device 210 may identify positive pattern information, negative pattern information, and potentially conflicting pattern information. For example, client device 210 may identify structural unit values that are present in positive samples (e.g., shown by reference number 538), structural unit values that are present in negative samples (e.g., shown by reference number 540), and structural unit values that are present in one or more positive samples and in one or more negative samples (e.g., shown by reference number 542). In some implementations, the pattern information may identify a structure to be used when generating additional samples, such as an order in which to place structural unit values, a likelihood of including a particular optional structural unit, or the like.

Client device 210 may determine the pattern information based on the structural representations corresponding to the positive samples and the negative samples. For example, the structural representations may include annotations and/or directed edges identifying a hierarchy and/or order of the structural units, may include nodes identifying structural unit values, or the like. Client device 210 may determine the pattern information based on the annotations, directed edges, and/or nodes.

Figure 5E:
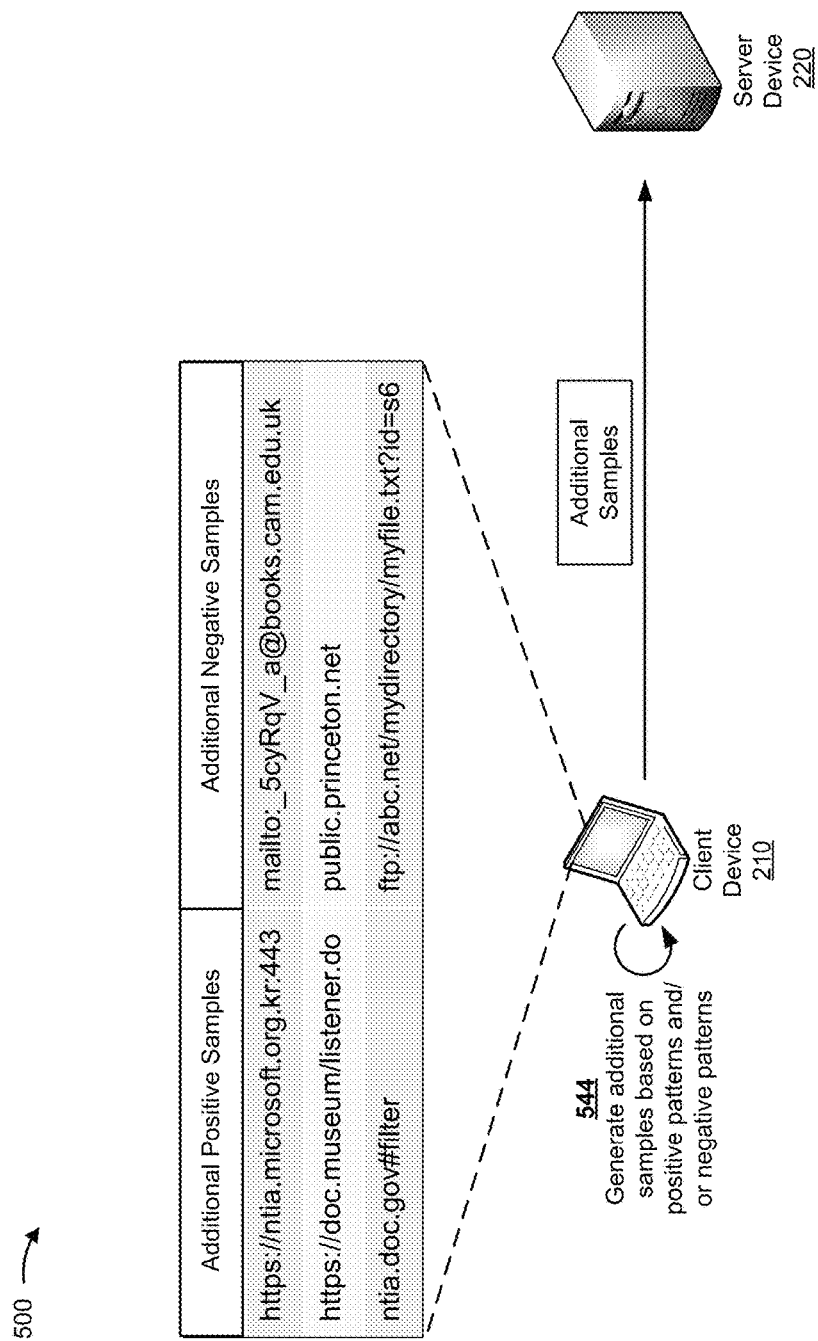

As shown in FIG. 5E, and by reference number 544, client device 210 may generate additional samples based on the pattern information. For example, when generating additional positive samples, client device 210 may use structural unit values included in the positive samples (e.g., reference number 538 of FIG. 5D) and/or may not use structural unit values included in the potentially conflicting pattern information (e.g., reference number 542 of FIG. 5D). As an illustration, none of the additional positive samples includes "http" as a scheme structural unit, based on "http" being identified in the potentially conflicting pattern information.

As another example, when generating additional negative samples, client device 210 may use structural unit values included in the negative samples (e.g., reference number 540 of FIG. 5D) and/or may not use structural unit values included in the potentially conflicting pattern information (e.g., reference 542 of FIG. 5D). As an example, none of the additional negative samples include port structural units, based on the only port structural unit value extracted from a negative sample (i.e., port "80") also being extracted from a positive sample.

As yet another example, client device 210 may arrange the structural units of the additional samples based on the directed annotated multi-hypergraphs shown in FIG. 5C. For example, based on information identifying an order and/or hierarchy of nodes associated with the structural units of the additional samples, client device 210 may arrange the structural units in a particular order.

As shown, client device 210 may provide the additional samples to server device 220 (e.g., for storage, processing, program testing, etc.). In some implementations, client device 210 may provide the additional samples for display to a user. For example, the user may interact with client device 210 to perform testing based on the additional samples, to provide information indicating whether the additional samples are accurate, or the like. In this way, client device 210 generates samples for a positive sample group and a negative sample group based on a data set of samples of the positive sample group and the negative sample group.

As indicated above, FIGS. 5A-5E are provided merely as an example. Other examples are possible and may differ from what was described with regard to FIGS. 5A-5E.

FIGS. 6A-6D are diagrams of example implementations 600 relating to example process 400 shown in FIG. 4. FIGS. 6A-6D show example implementations of structural representations corresponding to particular sample types.

Figure 6A:
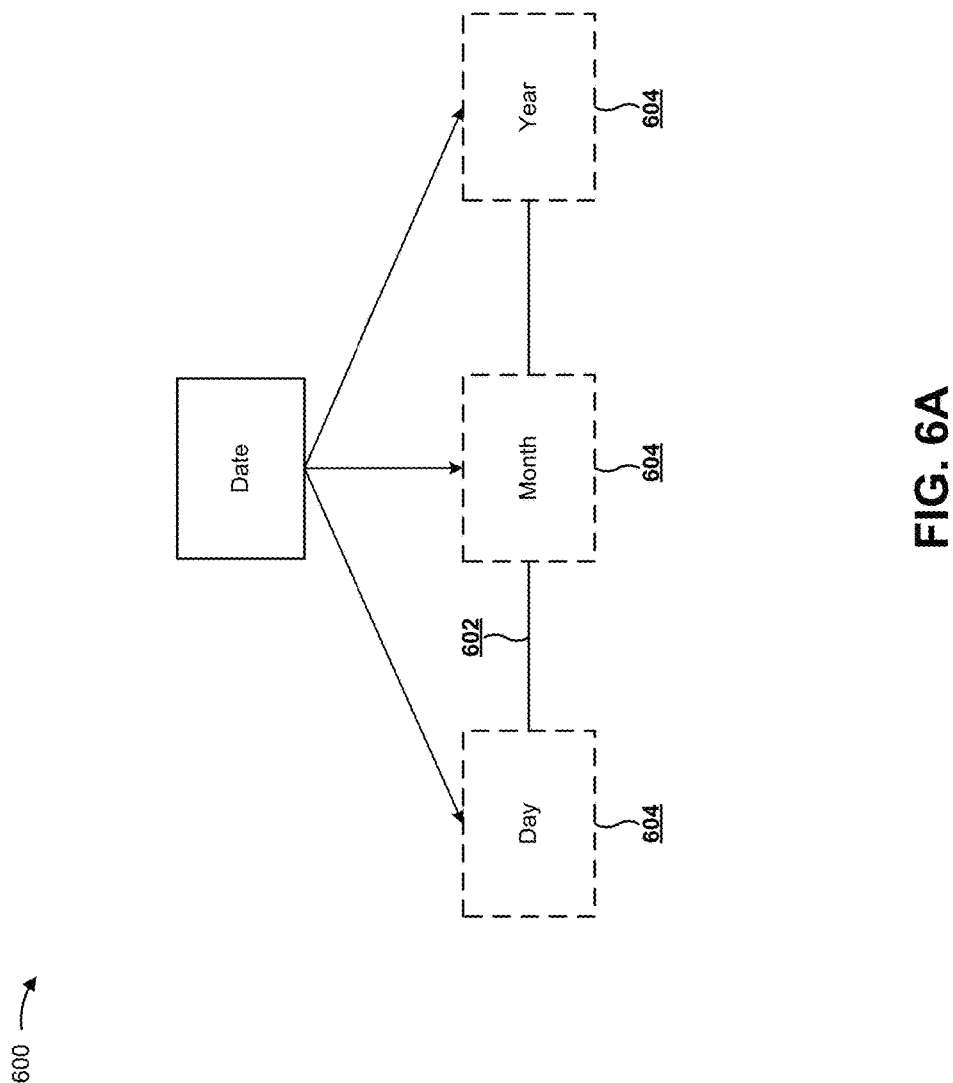
FIGS. 6A-6D are diagrams of an example implementation relating to the example process shown in FIG. 4.

FIG. 6A is a diagram of an example implementation of a structural representation corresponding to a date sample. As shown in FIG. 6A, and by reference number 602, nodes of the structural representation may be connected by undirected edges. For example, when a date may be formatted in any order (e.g., 04/22/1988, 22/04/1988, 1988/22/04, etc.), the nodes may be connected by undirected edges. As shown by reference number 604, each of the nodes of the structural representation may be an optional node (illustrated here using dashed borders). For example, a date sample may omit one or more of the day structural unit, the month structural unit, or the year structural unit. In such a case, the omitted node or nodes may be excluded from a structural representation corresponding to the date sample.

Figure 6B:
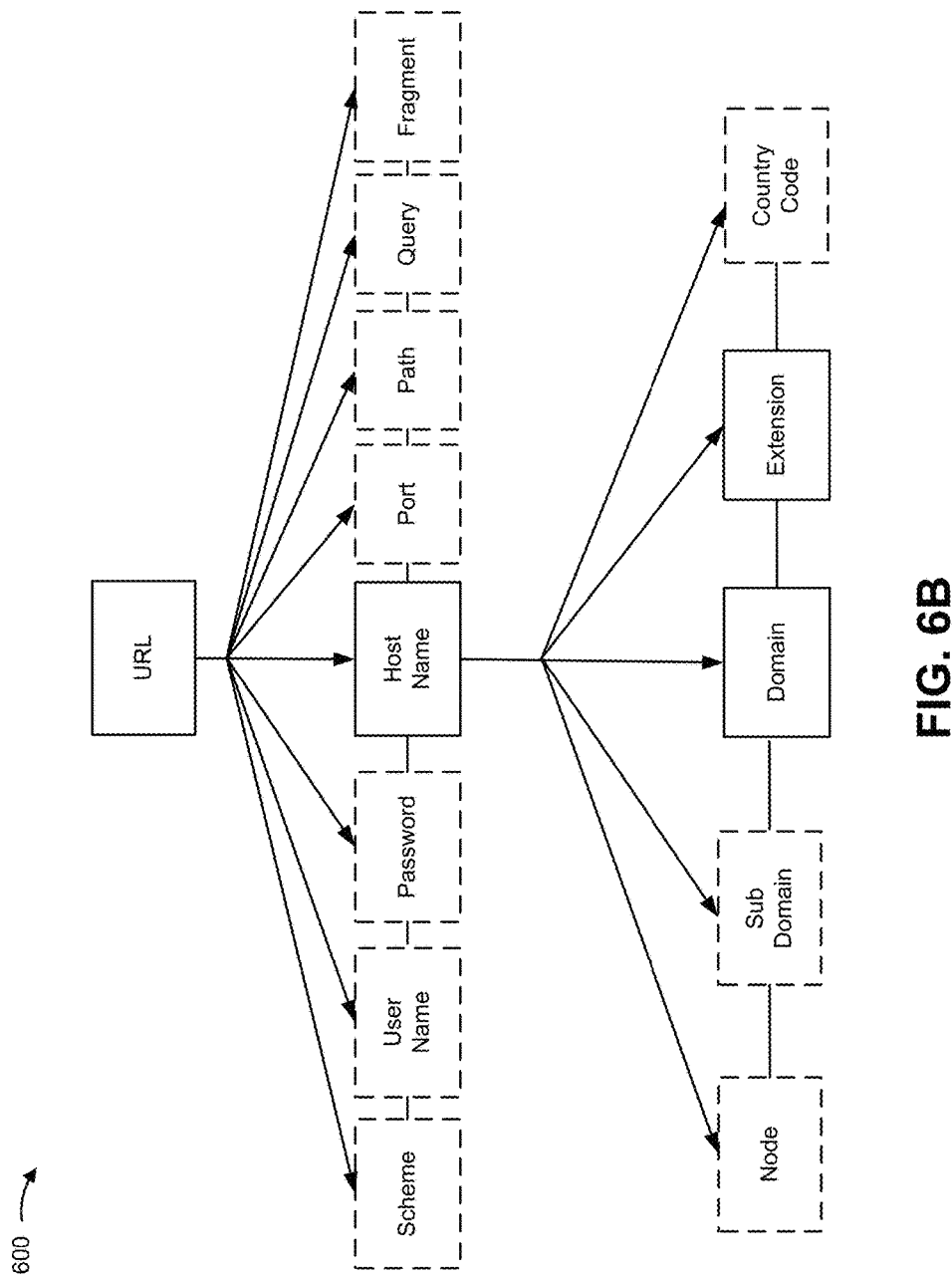

FIG. 6B is a diagram of an example implementation of a structural representation corresponding to a URL sample. As shown in FIG. 6B, the structural representation corresponding to the URL sample may include scheme, user name, password, host name, port, path, query, and/or fragment nodes. As further shown, the host name node may be a composite node, and may include node, sub-domain, domain, extension, and/or country code nodes, as indicated by the direction of the edges connecting the composite node with the nodes corresponding to the sub-units of the host name structural unit. As shown, the host name, domain, and extension nodes may be mandatory nodes, and the remaining nodes, other than the host name, domain, and extension nodes, may be optional nodes.

Figure 6C:
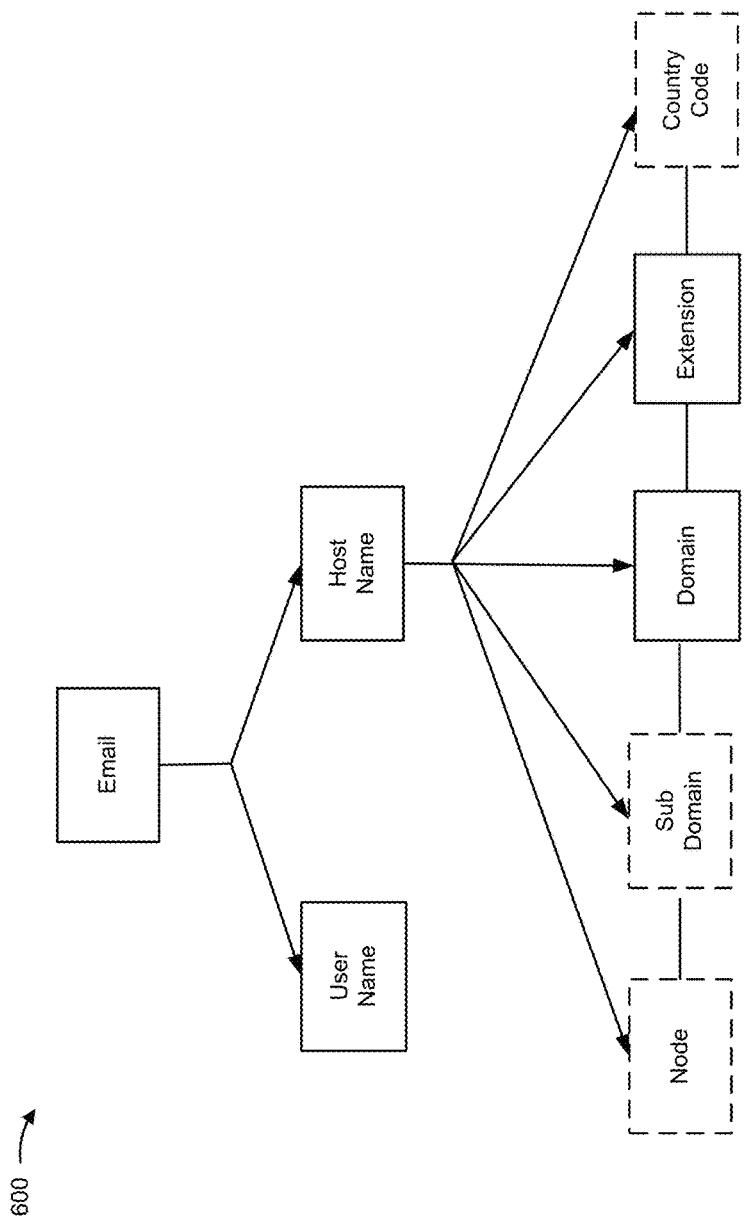

FIG. 6C is a diagram of an example implementation of a structural representation corresponding to an email address sample. As shown in FIG. 6C, the structural representation corresponding to the email address sample may include a user name node and a host name composite node, which may be mandatory nodes. As further shown, the host name composite node may be associated with optional nodes corresponding to a node sub-unit, a sub-domain sub-unit, and a country code sub-unit. As shown, the host name composite node may be associated with mandatory nodes corresponding to a domain sub-unit and an extension sub-unit.

Figure 6D:
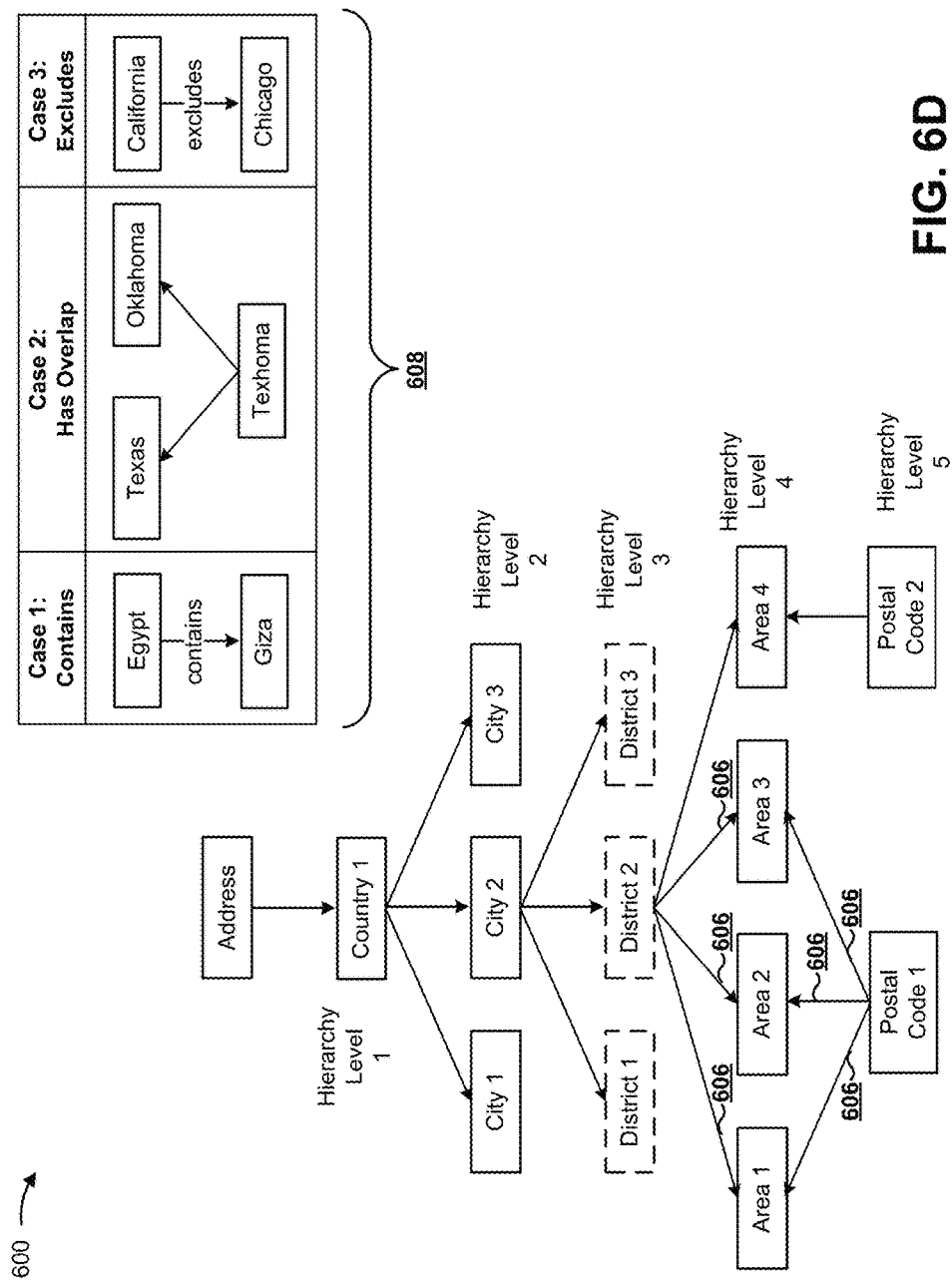

FIG. 6D is a diagram of an example implementation of a structural representation corresponding to a physical address sample. As shown in FIG. 6D, the structural representation corresponding to the physical address sample may be associated with hierarchy levels. For example, country nodes may be associated with a first, highest hierarchy level, city nodes may be associated with a second hierarchy level that is lower than country nodes (e.g., based on cities being included in countries), and so on. The hierarchy level may be used to determine an overlap threshold for generating additional samples, as described in more detail elsewhere herein. As shown, the physical address samples may further include district nodes, area nodes, and/or postal code nodes.

As shown by reference number 606, nodes corresponding to Area 1, Area 2, and Area 3 are each connected with nodes corresponding to District 2 and Postal Code 1. For example, Area 1, Area 2, and Area 3 may each be included in District 2, and physical addresses in Area 1, Area 2, and Area 3 may each be associated with Postal Code 2. As shown by reference number 608, some edges between nodes may be associated with annotations. For example, the annotation may indicate that a location identified by a first structural unit value is contained within a location identified by a second structural unit value (e.g., as Giza is contained within Egypt), may indicate that a location identified by a first structural unit value overlaps one or more locations identified by second structural unit values (e.g., as Texhoma is a city that partially overlaps Texas and partially overlaps Oklahoma), may indicate that a location identified by a first structural unit value is not included in a location identified by a second structural unit value (e.g., as Chicago is not included in California), or the like.

As indicated above, FIGS. 6A-6D are provided merely as an example. Other examples are possible and may differ from what was described with regard to FIGS. 6A-6D.

In this way, a client device generates positive samples and/or negative samples based on a data set without prior information regarding requirements corresponding to the positive samples and/or the negative samples. Furthermore, the client device determines pattern information regarding positive samples, negative samples, and potentially conflicting samples, which reduces a quantity of false positive or false negative samples generated by the client device, thereby conserving processor and/or storage resources of the client device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising: a memory, and one or more processors to: receive a plurality of samples that include textual content; extract unit values, corresponding to structural units, from the plurality of samples, the structural units identifying characteristics of the plurality of samples to be used to identify pattern information relating to the plurality of samples, the pattern information identifying shared unit values, of the unit values, that are included in at least two samples of the plurality of samples; generate one or more structural representations based on the unit values, the one or more structural representations identifying the pattern information; identify, based on generating the one or more structural representations, one or more conflicting structural unit values, the one or more conflicting structural unit values being one or more of the extracted unit values that are included in a first group of samples and a second group of samples; determine the pattern information, the pattern information excluding the one or more conflicting structural unit values; generate, based on the pattern information, one or more first additional samples, the one or more first additional samples including at least one of the unit values; test a computer program using the one or more first additional samples; adjust, based on testing the computer program, the pattern information; and generate, based on adjusting the pattern information, one or more second additional samples.

2. The device of claim 1, where the plurality of samples includes the first group of samples and the second group of samples, the first group of samples including samples that satisfy a criterion, and the second group of samples including samples that do not satisfy the criterion; and where the one or more processors, when generating the one or more first additional samples, are to: selectively generate the one or more first additional samples to satisfy the criterion or not to satisfy the criterion, the one or more first additional samples being generated to satisfy the criterion when the one or more first additional samples are to be included in the first group of samples, and the one or more first additional samples being generated to not satisfy the criterion when the one or more first additional samples are to be excluded from the first group of samples.

3. The device of claim 2, where the one or more processors, when generating the one or more first additional samples, are to: generate the one or more first additional samples using particular unit values that are included in one of the first group of samples or the second group of samples.

4. The device of claim 1, where the one or more processors are further to: determine at least one sample type associated with the plurality of samples, the at least one sample type being associated with structural units that are included in some of, or all of, the plurality of samples; and where the one or more processors, when extracting the unit values, are to: extract the unit values based on the sample type.

5. The device of claim 1, where a particular unit value is included in one or more samples of the plurality of samples; and where the one or more processors, when generating the one or more first additional samples, are to: include the particular unit value in a first quantity of the one or more first additional samples, the first quantity being determined based on a second quantity of the one or more samples in which the particular unit value is included.

6. The device of claim 1, where the one or more processors are further to: receive information identifying a modification relating to the pattern information; and modify the pattern information based on the information identifying the modification.

7. The device of claim 1, where the one or more processors, when generating the one or more first additional samples, are to: determine that a particular unit value is included in each sample of the plurality of samples; and include, in each of the one or more first additional samples, the particular unit value.

8. A non-transitory computer-readable medium storing instructions, the instructions comprising: one or more instructions that, when executed by one or more processors, cause the one or more processors to: receive a plurality of samples that include textual content; extract unit values, corresponding to structural units, from the plurality of samples, the structural units identifying characteristics of the plurality of samples to be used to identify pattern information relating to at least two samples of the plurality of samples, the pattern information identifying unit values that are shared between the at least two samples; generate one or more structural representations based on the unit values, the one or more structural representations identifying the pattern information; identify, based on generating the one or more structural representations, one or more conflicting structural unit values, the one or more conflicting structural unit values being one or more of the extracted unit values that are included in a first group of samples and a second group of samples; determine the pattern information, the pattern information excluding the one or more conflicting structural unit values; generate, based on the pattern information, one or more first additional samples, the one or more first additional samples including at least one of the unit values; test a computer program using the one or more first additional samples; adjust, based on testing the computer program, the pattern information; and generate, based on adjusting the pattern information, one or more second additional samples.

9. The non-transitory computer-readable medium of claim 8, where the plurality of samples includes one or more of: one or more positive samples that satisfy a criterion, or one or more negative samples that do not satisfy the criterion or that satisfy a different criterion.

10. The non-transitory computer-readable medium of claim 8, where the one or more instructions, that cause the one or more processors to extract the unit values, cause the one or more processors to: determine a sample type of the plurality of samples, the sample type being associated with structural units that are included in some of, or all of, the plurality of samples; and where the one or more instructions, that cause the one or more processors to extract the unit values, cause the one or more processors to: extract the unit values based on the sample type.

11. The non-transitory computer-readable medium of claim 8, where one or more instructions, when executed by the one or more processors, further cause the one or more processors to: input the one or more first additional samples to the computer program; determine whether the computer program accepts the one or more first additional samples or rejects the one or more samples; and selectively adjust the pattern information, or generate one or more other samples based on the pattern information, based on whether the computer program accepts the one or more first additional samples or rejects the one or more first additional samples, the pattern information being adjusted when the computer program rejects the one or more first additional samples, and the one or more other samples being generated based on the pattern information when the computer program accepts the one or more first additional samples.

12. The non-transitory computer-readable medium of claim 8, where the one or more instructions, when executed by the one or more processors, further cause the one or more processors to: determine the pattern information based on the one or more structural representations, the pattern information identifying an order in which unit values, of the one or more first additional samples, are to be arranged; and where the one or more instructions, that cause the one or more processors to generate the one or more first additional samples, cause the one or more processors to: generate the one or more first additional samples, the one or more first additional samples including a plurality of unit values, and the one or more first additional samples being generated based on the order.

13. The non-transitory computer-readable medium of claim 8, where the one or more first additional samples include: a particular unit value of the unit values extracted from the plurality of samples, and information associated with the particular unit value.

14. The non-transitory computer-readable medium of claim 13, where the particular unit value relates to a first geographical location, and where the information associated with the particular unit value relates to a second geographical location that is associated with the first geographical location.

15. A method, comprising: receiving, by a device, a plurality of samples that include textual content; extracting, by the device, unit values, corresponding to structural units, from the plurality of samples, the structural units identifying characteristics of the plurality of samples to be used to identify pattern information relating to the plurality of samples, the pattern information identifying unit values that are shared between at least two samples of the plurality of samples; generating, by the device, one or more structural representations based on the unit values, the one or more structural representations identifying the pattern information; identifying, by the device and based on generating the one or more structural representations, one or more conflicting structural unit values, the one or more conflicting structural unit values being one or more of the extracted unit values that are included in a first group of samples and a second group of samples; determining, by the device, the pattern information, the pattern information excluding the one or more conflicting structural unit values; generating, by the device and based on the pattern information, one or more first additional samples, the one or more first additional samples including at least one of the unit values; testing, by the device, a computer program using the one or more first additional samples; adjusting, based on testing the computer program, the pattern information; and generating, based on adjusting the pattern information, one or more second additional samples.

16. The method of claim 15, where generating the one or more structural representations comprises: generating a particular structural representation corresponding to a particular sample of the plurality of samples, the particular structural representation including nodes identifying unit values included in the particular sample, and the particular structural representation including one or more edges identifying one or more relationships between the nodes; and where generating the one or more first additional samples further comprises: generating the one or more first additional samples based on the particular structural representation, the one or more first additional samples being generated to include particular unit values in a particular order based on the particular structural representation.

17. The method of claim 16, where generating the particular structural representation comprises: generating a plurality of nodes corresponding to a plurality of structural units included in the particular sample; and associating, with the plurality of nodes, unit values corresponding to the plurality of structural units, the unit values being extracted from the particular sample.

18. The method of claim 15, where the one or more structural representations further comprise a plurality of directed graphs.

19. The method of claim 15, where each sample, of the plurality of samples, is associated with one of the first group of samples or the second group of samples, the first group of samples including samples that satisfy a criterion; and the second group of samples including samples that do not satisfy the criterion; and where generating the one or more first additional samples comprises: generating the one or more first additional samples to be associated with a selected group of the first group of samples or the second group of samples, the one or more first additional samples including unit values that were extracted from samples associated with the selected group.

20. The method of claim 15, where adjusting the pattern information comprises: adjusting the pattern information based on the computer program rejecting the one or more first additional samples.

* * * * *